(12) United States Patent
Douskey et al.

(10) Patent No.: US 9,134,375 B1
(45) Date of Patent: *Sep. 15, 2015

(54) HIERARCHAL TEST BLOCK TEST PATTERN REDUCTION IN ON-PRODUCT TEST COMPRESSION SYSTEM

(71) Applicant: International Business Machines Corporation, Armonk, NY (US)

(72) Inventors: Steven M. Douskey, Rochester, MN (US); Mary P. Kusko, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,344

(22) Filed: May 21, 2014

Related U.S. Application Data

(63) Continuation of application No. 14/196,465, filed on Mar. 4, 2014.

(51) Int. Cl.
  *G01R 31/28* (2006.01)
  *G01R 31/3177* (2006.01)

(52) U.S. Cl.
  CPC .................................. *G01R 31/3177* (2013.01)

(58) Field of Classification Search
  CPC .................. G01R 31/318547; G01R 31/3177; G01R 31/318563; G01R 31/318583; G01R 31/318536; G01R 31/318572; G01R 31/31921; G01R 31/318555; G01R 31/31926; G01R 31/31; G06F 17/505; G06F 11/267; G06F 11/263; G11C 29/1201; G11C 29/48; G11C 2029/3202
  See application file for complete search history.

(56) References Cited

U.S. PATENT DOCUMENTS

| | | |
|---|---|---|
| 6,553,530 B1 | 4/2003 | Kim |
| 6,715,105 B1 | 3/2004 | Rearick |
| 6,789,220 B1 | 9/2004 | Lovejoy |
| 7,353,440 B2 | 4/2008 | Ohwada et al. |
| 7,523,370 B1 * | 4/2009 | Keller ........................... 714/726 |
| 7,814,385 B2 | 10/2010 | Bahl |
| 7,900,105 B2 | 3/2011 | Kapur et al. |
| 7,979,764 B2 | 7/2011 | Foutz et al. |

(Continued)

OTHER PUBLICATIONS

Barnhart et al., "Extending OPMISR Beyond 10x Scan Test Efficiency", Design & Test of Computers, IEEE, vol. 19, Issue 5, Sep.-Oct. 2002, pp. 65-73. DOI: 10.1109\MDT.2002.1033794.

(Continued)

*Primary Examiner* — Guerrier Merant
(74) *Attorney, Agent, or Firm* — Nolan M. Lawrence; Robert Williams

(57) ABSTRACT

A method of creating a scan pattern test file for testing hierarchal test blocks (HTBs) of scan channels on a semiconductor chip is described. The method includes determining a maximum number of channel mask enable encodes on the semiconductor chip. A maximum number of channel mask enable encodes used for the first HTB and the second HTB are determined. A plurality of test patterns used to test the first and the second HTB into one or more mask sets dependent on the number of masks each test pattern needs are sorted. The test patterns of the mask sets of the first and second HTB to be performed in a same test pattern are combined. The number of masks per scan cycle of the combined mask sets is no more than the maximum number of channel mask enable encodes on the semiconductor chip and there is no scan slice overlap.

14 Claims, 12 Drawing Sheets

(56) References Cited

U.S. PATENT DOCUMENTS

2013/0173979 A1     7/2013   Goessel et al.
2013/0232458 A1     9/2013   Wohl et al.

OTHER PUBLICATIONS

Chickermane et al., "Channel Masking Synthesis for Efficient On-Chip Test Compression", ITC 2004, International Test Conference, 2004. Proceedings., pp. 452-461, © 2004 IEEE. DOI: 10.1109\TEST.2004.1386981.

Holst et al., "A Diagnosis Algorithm for Extreme Space Compaction", Date '09: Design, Automation & Test in Europe Conference & Exhibition, pp. 1355-1360, © 2009 EDAA. DOI: 10.1109\DATE.2009.5090875.

IBM, "Modified Multiple Input Signature Register and Reconfigured Scan Chains to Improved Test Diagnostics", IP.com Prior Art Database Technical Disclosure, IP.com No. IPCOM000184446D, Published Jun. 25, 2009. http://ip.com/IPCOM/00018446.

Keller, B., "Encounter Test OPMISR+ On-Chip Compression", ITC 2005, IEEE International Test Conference, 2005. Proceedings., pp. 1-2, © 2005 IEEE. DOI: 10.1109\TEST.2005.1584112.

Rajski et al., "Embedded Deterministic Test for Low Cost Manufacturing Test", International Test Conference, 2002. Proceedings., pp. 301-310, © 2002 IEEE. DOI: 10.1109\TEST.2002.1041773.

Vranken et al., "Fault Detection and Diagnosis with Parity Trees for Space Compaction of Test Responses", 2006 43rd ACM/IEEE Design Automation Conference, pp. 1095-1098, © 2006 ACM. DOI: 10.1109/DAC.2006.229403.

Douskey et al., "Shared Channel Masks in On-Product Test Compression System", U.S. Appl. No. 14/196,448, filed Mar. 4, 2014.

Douskey et al., "Shared Channel Masks in On-Product Test Compression System", Filed May 21, 2014.

Douskey et al., "Hierarchal Test Block Test Pattern Reduction in On-Product Test Compression System", Filed Mar. 4, 2014.

\* cited by examiner

HIERARCHAL TEST BLOCK TEST PATTERN REDUCTION IN ON-PRODUCT TEST COMPRESSION SYSTEM

BACKGROUND

The present disclosure relates to testing electronic components, and more specifically, hierarchal test block test pattern reduction in on-product test compression (OPTC) systems.

Digital Integrated Circuits (ICs) can be prone to defects introduced during a manufacturing process. These defects may affect the logic output of the digital IC, which in turn adversely influences semiconductor chip quality and costs. Industry has developed a number of testing techniques to test for the defects. To test for defects, an OPTC network may be built into an IC, allowing the IC to test its own operations. OPTC networks may be implemented using hardware, software, or a combination of the two.

SUMMARY

According to embodiments of the present disclosure, method of creating a scan pattern test file for testing hierarchal test blocks (HTBs) of scan channels on a semiconductor chip is described. In other embodiments, a computer program product and computer system with a memory are adapted to perform the same. The method includes determining a maximum number of channel mask enable encodes on the semiconductor chip. A maximum number of channel mask enable encodes used for the first HTB and the second HTB may be determined. A plurality of test patterns used to test the first HTB and the second HTB into one or more mask sets dependent on the number of masks each test pattern needs may be sorted. The mask sets increase in mask number from a zero mask set to a mask set having the maximum number of channel mask enable encodes used for the respective HTBs. The test patterns of the mask sets of the first HTB and the second HTB to be performed in a same test pattern may be combined. The number of masks per scan cycle of the combined mask sets is no more than the maximum number of channel mask enable encodes on the semiconductor chip and there is no scan slice overlap.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

Aspects of the present disclosure relate to testing electronic components, more particular aspects relate to shared channel masks in an on-product test compression (OPTC) system and a method of sorting and combining test patterns of hierarchal test blocks (HTB) of scan channels to cycle patterns concurrently while minimizing over-masking. A mask is required when a scan channel latch produces and indeterminate also referred to as an X-state result when a test pattern is cycled through it. Masks may be shared between scan channels and HTBs. The sharing may result in over-masking where a mask is enabled for one scan channel or HTB that needs the mask but inadvertently masks good results from other scan channels or HTBs. The method includes creating individual tests for each unique HTB and sorting the patterns of each test into mask sets. The mask sets are defined by the number of masks each pattern requires. The mask sets of each are then combined to run concurrently in a way that limits over-masking over different HTBs. Embodiments also include mask logic that can essentially increase the number of mask enables, which can be used in conjunction with the method to sort and combine masks of HTBs in larger combinations to prevent over-masking. While the present disclosure is not necessarily limited to such applications, various aspects of the disclosure may be appreciated through a discussion of various examples using this context.

Figure 1:
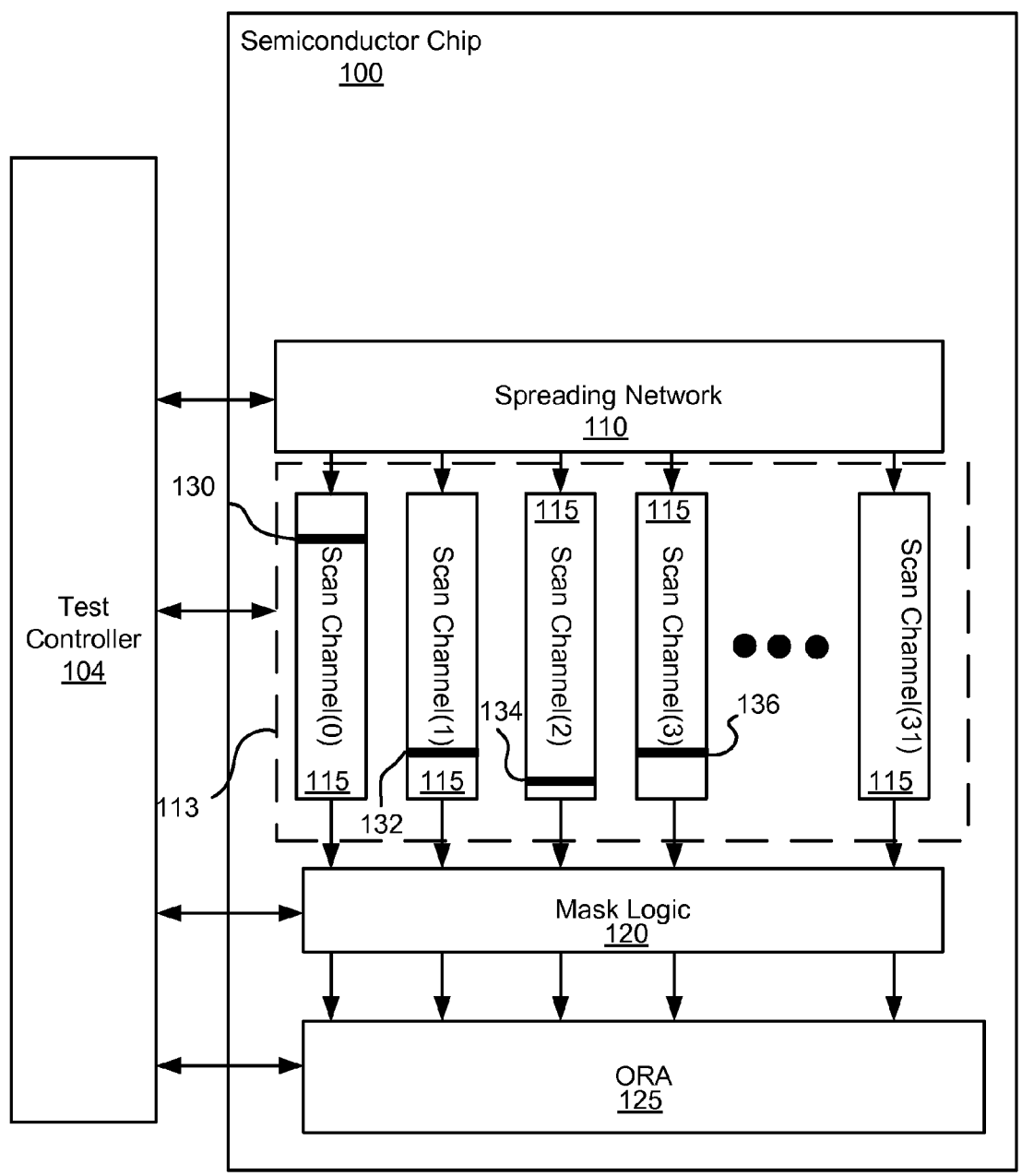
FIG. 1 illustrates a high level block diagram of a semiconductor chip having a OPTC system, according to various embodiments.

FIG. 1 illustrates a high level block diagram of a semiconductor chip 100 having an OPTC system and a test controller 104, according to various embodiments. The semiconductor chip 100 may include at least a spreading network 110, a circuit under test (CUT) 113, mask logic 120, and an output response analyzer (ORA) 125. The test controller 104 may be in communication the spreading network 110, the CUT 113, channel mask logic 120, and ORA 125. The test controller 104 may include modules used to control the components of the test including the channel mask logic 120 and may also provide the test patterns for the semiconductor chip 100. The spreading network 110 may spread the test patterns to a plurality of scan channels 115 within the CUT 113. Each scan channel 115 may include a plurality of scan latches. When a test pattern enters the scan channels a scan output may be produced from the scan channels 115 and sent to an ORA 125 to determine whether the CUT 113 is functioning properly. The ORA 125 may include a multiple input signature register (MISR). The MISR may compress the scan outputs for each pattern to produce a scan signature which may be compared to a predicted signature. If the signatures are identical, then the CUT 113 functions properly.

However, certain scan latches of the scan channels 115 may output unknown results, also referred to as X-states herein, to the multiple input signature register (MISR) or an on-product multiple input signature register (OPMISR). In a MISR-based compaction scheme, the presence of a single X-state in any on of the scan channels may invalidate the MISR signature once it is captured. Every MISR signature captured after that scan cycle may be unpredictable as well and the results may have to be excluded from the test coverage calculations. In FIG. 1, block 130 in scan channel(0), block 132 in scan channel(1), block 134 in scan channel(2), and block 136 in scan channel(3) represent latches of each scan channel that produce an X-state from a particular test pattern. Scan channel(4)—scan channel(31) may have scan latches that do not produce any X-states for the test pattern.

Channel mask logic 120 may be included in the BIST system, which may mask the unknown X-state test results of the scan outputs with valid results before the scan outputs enter the MISR for compression. One implementation of mask logic 120 includes two mask-bits per channel and it also utilizes two streams of channel mask enable (CME) data stored off-chip or with the test controller 104. The CME data may be controlled by two channel mask enable signals CME0 and CME1 on two respective CME pins. Cumulatively, this provides four possible states: three channel-masking states and one non-masking state. The three channel-masking states may be a first unique mask, a second unique mask, and a mask all inputs. For instance, when CME0 is a logical one and CME1 is a logical zero the first unique mask may be active. When CME0 is a logical zero and the CME1 is a logical one the second unique mask may be enabled. When both CME0 and CME1 are logical ones, then an entire scan slice may be masked. When both CME0 and CME1 are logical zeros, then no mask may be enabled. The CME pins may switch to a new state on each scan cycle for each scan slice.

Figure 2:
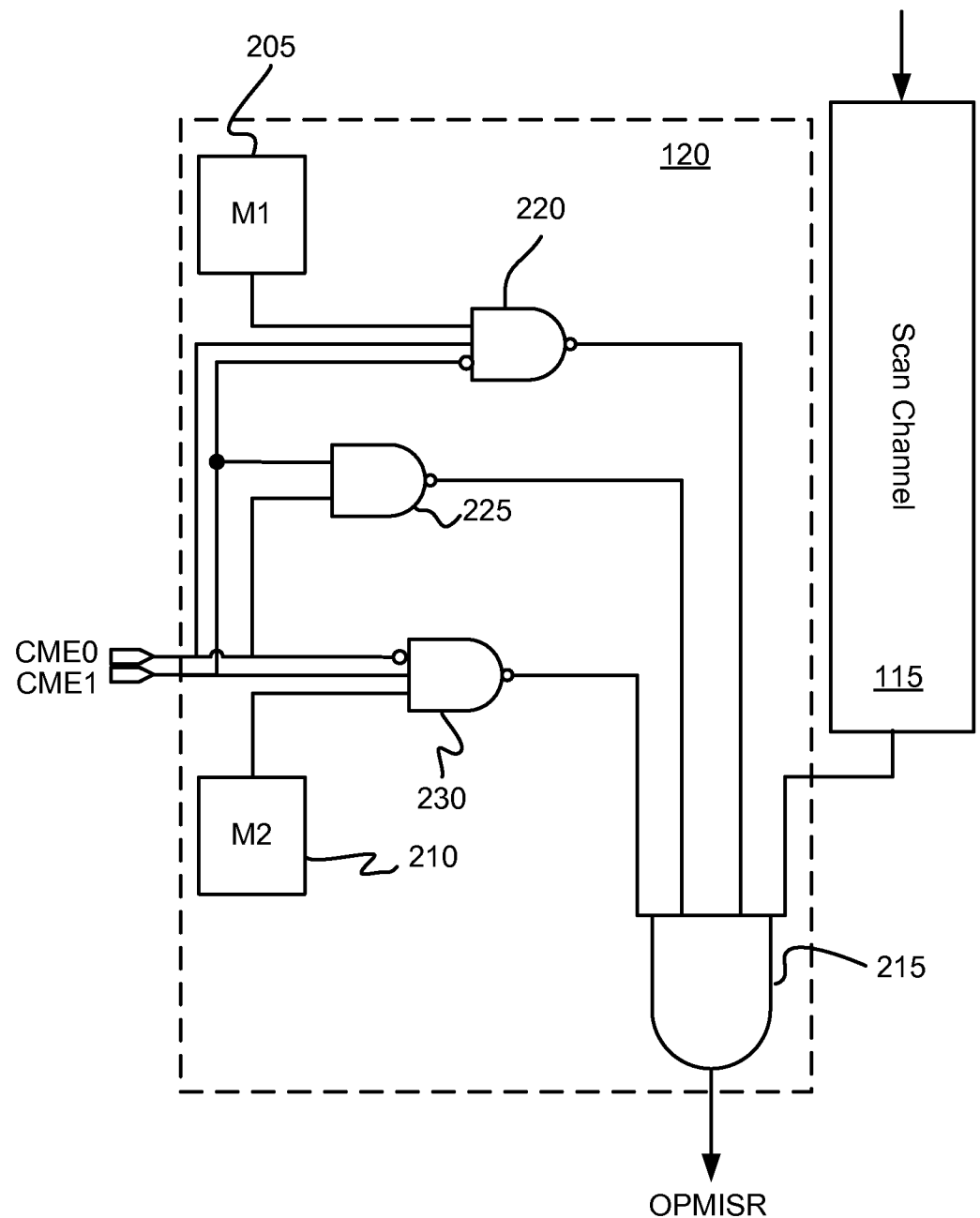
FIG. 2 illustrates the mask logic with two mask bits for each scan channel, according to various embodiments.

FIG. 2 illustrates the mask logic 120 with two mask bits for each scan channel 115, according to various embodiments. The mask logic 120 may include a first mask 205 and a second mask 210. An output of a first mask (M1) 205 signals a first input of a NAND gate 220. A first channel mask enable CME0 may signal a second input of the NAND gate 220, a first input of a NAND gate 225 and feed an inverted input to NAND 230. A second mask (M2) 210 may signal a first input of a NAND gate 230. A second channel mask enable CME1 may signal a second input of NAND gate 225, a second input of NAND gate 230 and feed an inverted input to NAND 220. An AND gate 215 may receive a scan output from the scan channel 115 at a first input, an output of the NAND gate 220 at a second input, an output of the NAND gate 225 at a third input, and an output of the NAND gate 230 at a forth input. Each scan channel in the CUT 113 of FIG. 1 may have an AND gate like AND gate 215 where a first input of each AND gate may receive a respective scan outputs. The other inputs of the AND gates may receive the outputs of the NAND gates like NAND gates 220 and 230, which means they may share the channel mask enables CME0 and CME1 and NAND gate 225.

Different CME signals may determine which mask to use and whether a mask should be used or not for a scan slice. When both CME0 and CME1 are logical ones, then all scan channels of the scan output are masked at that time. When both CME0 and CME1 are logical zeros, then there are no masks in the current scan slice that is the scan output. If CME0 is a logical one and CME1 is a logical zero, then the scan channels 115 are masked when the first mask 205 has a logical one for a particular scan channel 115. If the first mask 205 has a logical zero for a specific scan channel, those scan channels remain unmasked. Likewise, if CME0 is a logical zero and CME1 is a logical one, then the scan channels 115 are masked when the second mask 210 has a logical one for a particular scan channel. If the second mask 210 has a logical zero for a specific scan channel, those scan channels remain unmasked.

Having the four possible mask states works well in situations where there is a good circuit design not requiring a lot of masking. However, when a circuit under test such as CUT 113 requires a lot of masking or when performing hierarchical testing (discussed below), over-masking may occur as a result of the limited enables. When a CUT requires a lot of masking due to a large number of scan latches with X-states, then over-masking, also referred to as false masking herein, may occur.

An example of false masking may be shown with respect to FIG. 1. Block 130 of scan channel(0) represents an X-state. The masking logic 120 may be adapted to mask block 130 with the first unique mask when CME1 and CME0 signal a respective '01'. Block 132 of scan channel(1) and block 136 of scan channel(3) may be X-states in the same scan slice. Therefore, the mask logic 120 may be adapted to mask both blocks 132 and 136 with the second unique mask when CME1 and CME0 signal a respective '10'. Both blocks 132 and 136 may be masked leaving the latches within the scan slice of the remaining scan channels to be unmasked. At this point, both the first unique mask and the second unique mask have been used. However, there is a remaining block, block 134 of scan channel(2), which produces an X-state.

One of the unique masks may need to be used to mask block 134. This is where false masking may occur. Since two scan channels are sharing the second unique mask, the first unique mask may be chosen to mask block 134. However, since scan channel(0) uses that mask as well, when the first unique mask is enabled for block 134 it is also going to mask a block of scan channel(0) that is in the same scan slice as block 134, which does not produce an X-state in this example. Also, since both scan channel(0) and scan channel(2) are sharing the first unique mask, when the mask is enabled for block 130 in scan channel(0), then it is also enabled for the block in the same scan slice of block 130 for scan channel(2), which may not produce an X-state. These over-masked valid responses may not be included in the test data received by the MISR reducing the quality of the test.

Some over-masking may be acceptable. Over-masking is not always going to lead to loss of test coverage when the over-masking is limited. However, in circuits requiring heavy masking or implementing a hierarchal test, over-masking can limit test coverage to a point where it is a burden. Hierarchal testing may be dividing the scan channels 115 of the CUT 113 into smaller areas or groups that may be tested independently. Each area may be referred to as a hierarchal test block (HTB).

Each HTB may have its test generated independently to allow a smaller test model and lower processing time. In current methodologies, both mask data and the CME pins are shared between the HTBs, so either each HTB must be tested independently or a larger model created that combines multiple HTBs for test generation. The creation of a larger model somewhat defeats the purpose of the hierarchal test.

The more HTBs that are combined, the more false masking may occur. This is because the HTBs share the masks and CME signals. For example, a first HTB may be tested concurrently with a second HTB. At a particular scan cycle, the first HTB may need a mask such as the first mask 205 in a scan slice (one cycle scan data across all scan outputs). When the mask is triggered for the first HTB it will also be triggered for the second HTB since they may share the same CME signals such as CME0 signaling a logical 1 and CME1 signaling a logical zero. The mask in the second HTB may not be needed for that scan slice. The mask, the second HTB receives, may be defined for use on a different scan slice in the same test. So when the mask for the second HTB is triggered, it may trigger a false mask in the first HTB as well. Adding two CME inputs for each HTB and more masks may solve this dilemma. However, hardware overhead and usage of more test input resource makes this option costly in performance of the test and chip space. A procedure for pattern compression when performing hierarchal test is presented in various embodiments of this disclosure. Furthermore, an encoding scheme that can more focus masking on an HTB that needs it is also presented in various embodiments of this disclosure. These embodiments may allow for use of smaller individual HTB models for quicker processing, limit false masking that results in less coverage loss, and creates fewer test patterns saving test time or allowing more patterns for better test coverage.

Figure 3:
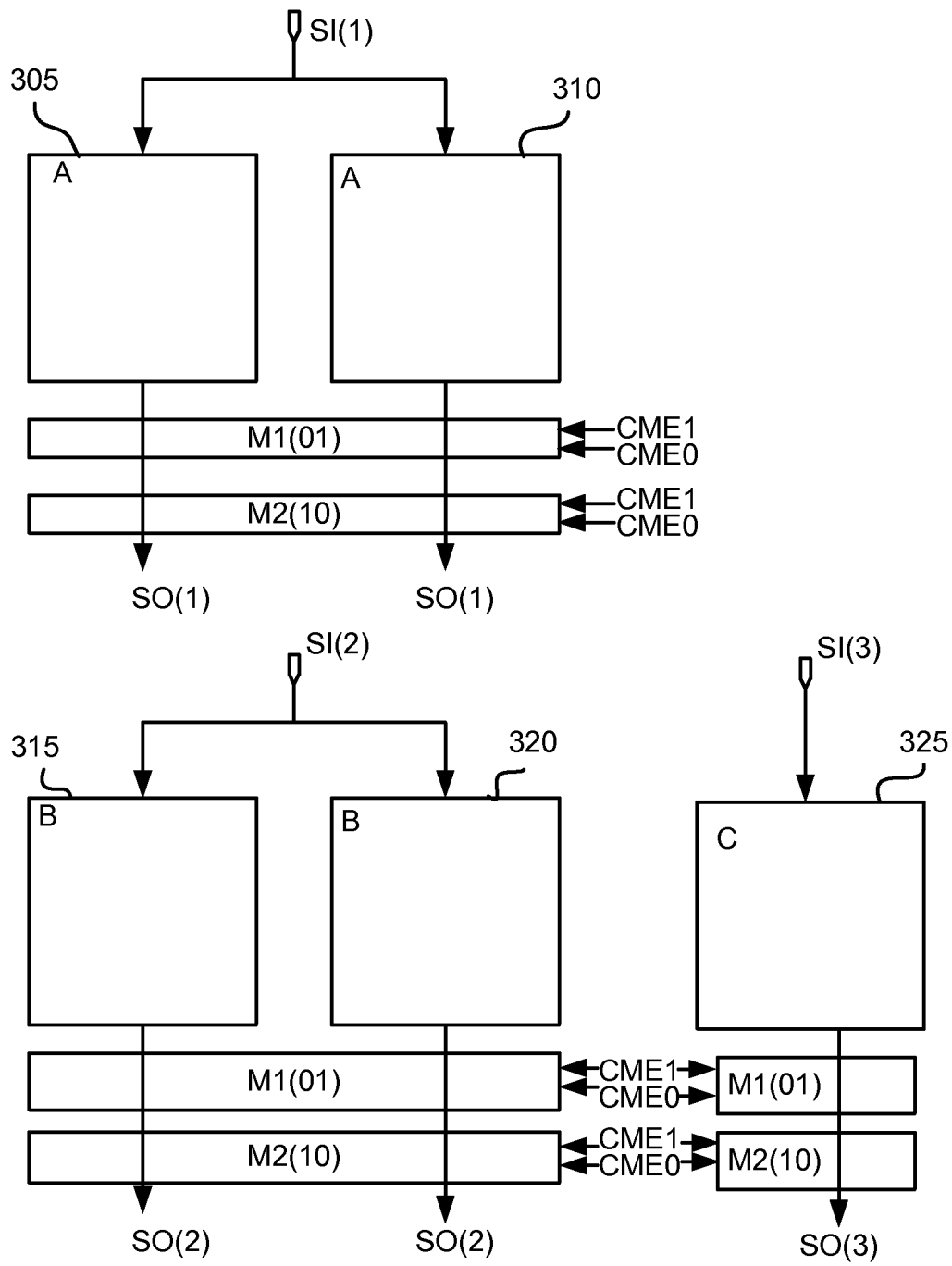
FIG. 3 illustrates a semiconductor chip having a plurality of hierarchal test blocks (HTBs), according to various embodiments.

FIG. 3 illustrates a semiconductor chip 300 having a plurality of hierarchal test blocks (HTBs), according to various embodiments. In the example shown in FIG. 3 there are five HTBs: HTB A 305, HTB A 310, HTB B 315, HTB B 320, and HTB C 325. Combining HTBs that are identical such as the HTB A 305 and 310 and HTB B 315 and 320 may be free in that they can share the same scan inputs and mask encodes. In FIG. 3 there are three unique HTBs: HTB A, HTB B, and HTB C. A scan input signal SI(1) may input into the HTB A 305 and 310. Each may output a scan output SO(1). HTB A 305 and 310 may be masked by a first mask M1 that may be assigned to a CME encode of (01) from CME1 and CME0, respectively, and by a second mask M2 that may be assigned to a CME encode (10) from CME1 and CME0, respectively. The CME encodes may signal when their respective masks are to be enabled.

A scan input signal SI(2) may input into the HTB B 315 and 320. Each may output a scan output SO(2). HTB B 315 and 320 may be masked by a first mask M1 that may be assigned a CME encode of (01) from CME1 and CME0, respectively, and by a second mask M2 that may be assigned a CME encode (10) from CME1 and CME0, respectively.

A scan input signal SI(3) may input into the HTB C 325. HTB C 325 may output a scan output SO(3). HTB C 325 may be masked by a first mask M1 that may be assigned a CME encode of (01) from CME1 and CME0, respectively, and by a second mask M2 that may be assigned a CME encode (10) from CME1 and CME0, respectively.

Each of the unique HTBs may require 1000 patterns for their independent tests. As stated before, each HTB is currently tested serially, which means that if HTB A, HTB B, and HTB C have 1000 patterns each for their test, the total number of patterns tested would be 3000. Running the patterns concurrently may present over masking issues as stated before. Furthermore, mask loading for every pattern can take a large part of the test time and data volume. Various embodiments herein describe a method of combining and sorting patterns of the HTBs that have similar masking needs to reduce data volume and test time.

Figure 4:
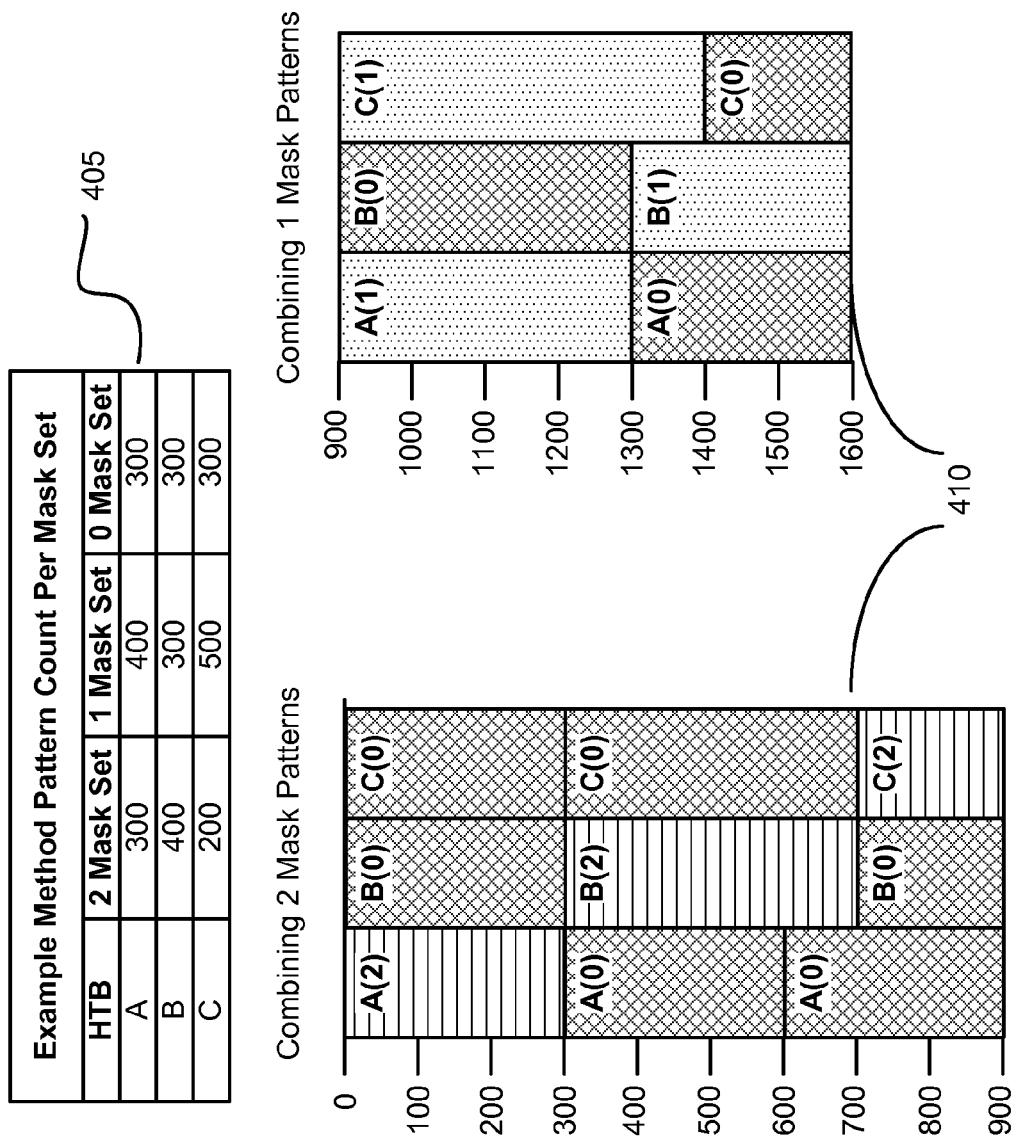
FIG. 4 illustrates a graphical representation of a method of sorting and combining test patterns of various HTBs, according to various embodiments.

FIG. 4 illustrates a graphical representation of a method of sorting and combining test patterns of various HTBs, according to various embodiments. The test patterns for an HTB may be sorted out into groups of two, one, or zero mask sets. For example, a two mask set needs both masks M1 and M2 for the test patterns within it. A one mask set needs one of the masks for its patterns. A zero mask set may need no masks for its patterns. Table 405 illustrates the HTBs of FIG. 3 and the test pattern count per mask set for an illustrative example. HTB A may have 300 test patterns that need the two mask set, 400 test patterns that require the one mask set, and 300 test patterns that require the zero mask set. HTB B may have 400 patterns that require the two mask set, 300 patterns that require the one mask set, and 300 patterns that require the zero mask set. The HTB C may have 200 patterns that require the two mask set, 500 patterns that require the one mask set, and 300 patterns that require the zero mask set. A mask pattern module sorting the patterns may know where the latches are within the scan channels that produce X-state results. The mask pattern module may know from the patterns it produces or from the test patterns a built in tester produces which patterns will need a certain number of masks. In this example, it is assumed that a test pattern is not going to be completely masked with a CME0 and CME1 encode of (11). The mask pattern module may be computer program product or physical logic that may perform the method of sorting and combining test patterns of various HTBs of the semiconductor chip. The mask pattern module may be stored in memory and executed by a processor either on or off the semiconductor chip 100 according to various embodiments. The mask pattern module is further described below in FIG. 11.

Once the patterns are sorted, the mask pattern module may combine the groups of patterns from the various HTBs so that not more than the greatest number of mask encodes are used for a combined test pattern. In the chart 410, by using the information in table 405, the mask pattern module may align the HTB patterns requiring the two mask patterns serially because the maximum number of mask encodes is two. If the mask pattern module aligned the HTB patterns requiring two mask patterns or even patterns requiring one mask pattern together in the same scan slice, then false masking may occur across HTBs. Therefore, the two mask sets of the HTBs are serial and are padded with zero mask sets of the other HTBs. Padded means that the test patterns of one HTB are combined with test patterns of another HTB so that they may cycle concurrently. In chart 410, patterns of HTB A with two mask sets A(2) may be the first 300 patterns performed, patterns of HTB B with two mask sets B(2) may be the next 400 patterns performed, and patterns of HTB C with two mask sets C(2) may be the next 200 patterns performed. While each of the two mask sets of the HTBs are performed, patterns requiring zero masks of other HTBs may pad the patterns that require two masks. Therefore, essentially 1800 patterns from the two mask set and the zero mask set of table 405 are reduced to 900 patterns. Also, since more zero mask set patterns can be used to pad the two mask set patterns than what HTB A, HTB B, and HTB C originally had, then the zero mask set patterns may be repeated or other zero mask set patterns may be added to the test.

After the two mask set patterns have been combined with the zero mask set patterns, then the one mask set patterns may be combined. The mask pattern module may pad the largest one mask set with the next largest mask set. The zero mask set of the remaining HTB may be padded also with the two one mask sets. The remaining mask set or the mask set with the least number of patterns may begin once the mask set with the next largest pattern count finishes.

For example, chart 410 continues at pattern 900. The largest one mask set, C(1), begins at pattern 900. The next largest mask set, A(1) may be padded with C(1). Since A(1) and C(1) only need one mask each, then they may be combined without over-masking. The remaining HTB B may pad A(1) and C(1) with B(0) zero mask set patterns. Once A(1) finishes at pattern 1300, then B(1) may begin, which will end at pattern 1600 and be padded with the remaining C(1) mask sets patterns and with A(0) and C(0) mask set patterns. Sorting and combining mask sets of the different HTBs reduces the number of patterns from 3000 to 1600 in this example. Furthermore, in this example, the total number of zero mask set patterns tested may be increased from 900 to 2700 patterns.

Figure 5:
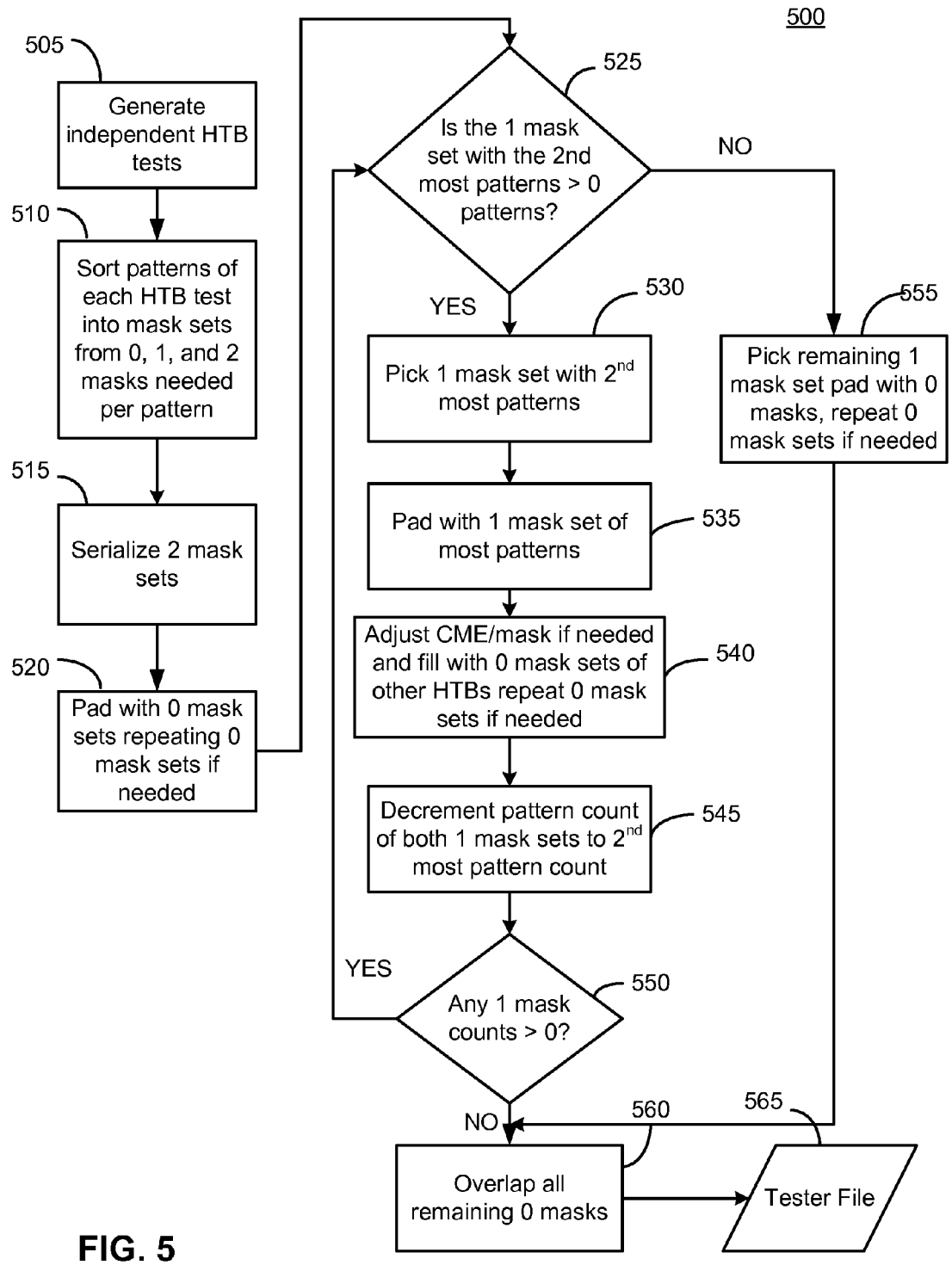
FIG. 5 illustrates a flow diagram of a method that represents the method graphically illustrated in FIG. 4, according to various embodiments.

FIG. 5 depicts a flow diagram of a method 500 that represents the method graphically illustrated in FIG. 4, according to various embodiments. In operation 505, the independent tests may be generated for each unique HTB on the semiconductor chip. In operation 510, the mask pattern module may sort the patterns of each HTB test into mask sets. Each mask set may be the number of masks each pattern requires. Zero, one, and two masks per pattern may be the possible numbers of masks per pattern. However, other mask quantities may be contemplated per pattern. A maximum number of masks may be contemplated. The sorting may be done from mask sets requiring zero masks to the maximum mask set.

In operation 515, the mask pattern module may serialize the two mask sets meaning one will begin when another ends. In other embodiments, if the number of mask encodes is greater than two, then other two mask sets may be combined or other various numbered mask sets may be combined with the up to the number of mask encodes on the chip. For instance if there are 3 mask encodes, then a two mask set may be combined with a one mask set and performed in parallel. The numbered mask set must be no more than the number of encodes available.

In operation 520, once the two mask sets have been serialized they may be padded with zero mask sets from remaining HTBs. The zero mask set patterns may be repeated even after they have already been padded with other mask sets.

In operation 525, mask pattern module may determine whether a one mask set with the second most patterns is greater than zero patterns. If the one mask set with the second most patterns has more than zero patterns, then in operation 530 the one mask set with the second most patterns may be selected. In operation 535, the one mask set with the second most patterns may be padded with a one mask set having the most patterns. In operation 540, the CME and mask may be adjusted so one mask sets that are combined have separate encodes. The one mask set patterns performed in parallel may be padded with unrepresented HTBs zero mask sets. The HTB patterns with zero mask sets may be repeated more than once, if needed. In operation 545 the pattern count of both one mask sets (largest pattern one mask set and second largest pattern one mask set) may be decremented to second most pattern count of one mask sets.

In operation 560, the mask pattern module may determine whether any one mask sets with pattern counts that are greater than zero remain uncombined. If there are one mask sets with pattern counts greater than zero, then the method 500 may return to operation 525 where it is determined whether the one mask set with the second most patterns has a pattern count greater than zero patterns. If it is not greater than zero, then in operation 655 the mask pattern module may select the remaining one mask set and pad it with zero mask sets. The zero mask sets may be used again, if they were used in combination with other mask sets. In operation 560, once all one mask sets have been combined, then any remaining zero mask sets may be combined. In operation 565, after all of the mask sets have been sorted and combined, the combined mask sets may be stored as a scan pattern test file to be executed when testing HTBs. In various embodiments, the scan pattern test file may be executed by the test controller 104 of FIG. 1. In other embodiments the scan pattern test file may be executed by device in communication with the semiconductor chip being tested.

Figure 6:
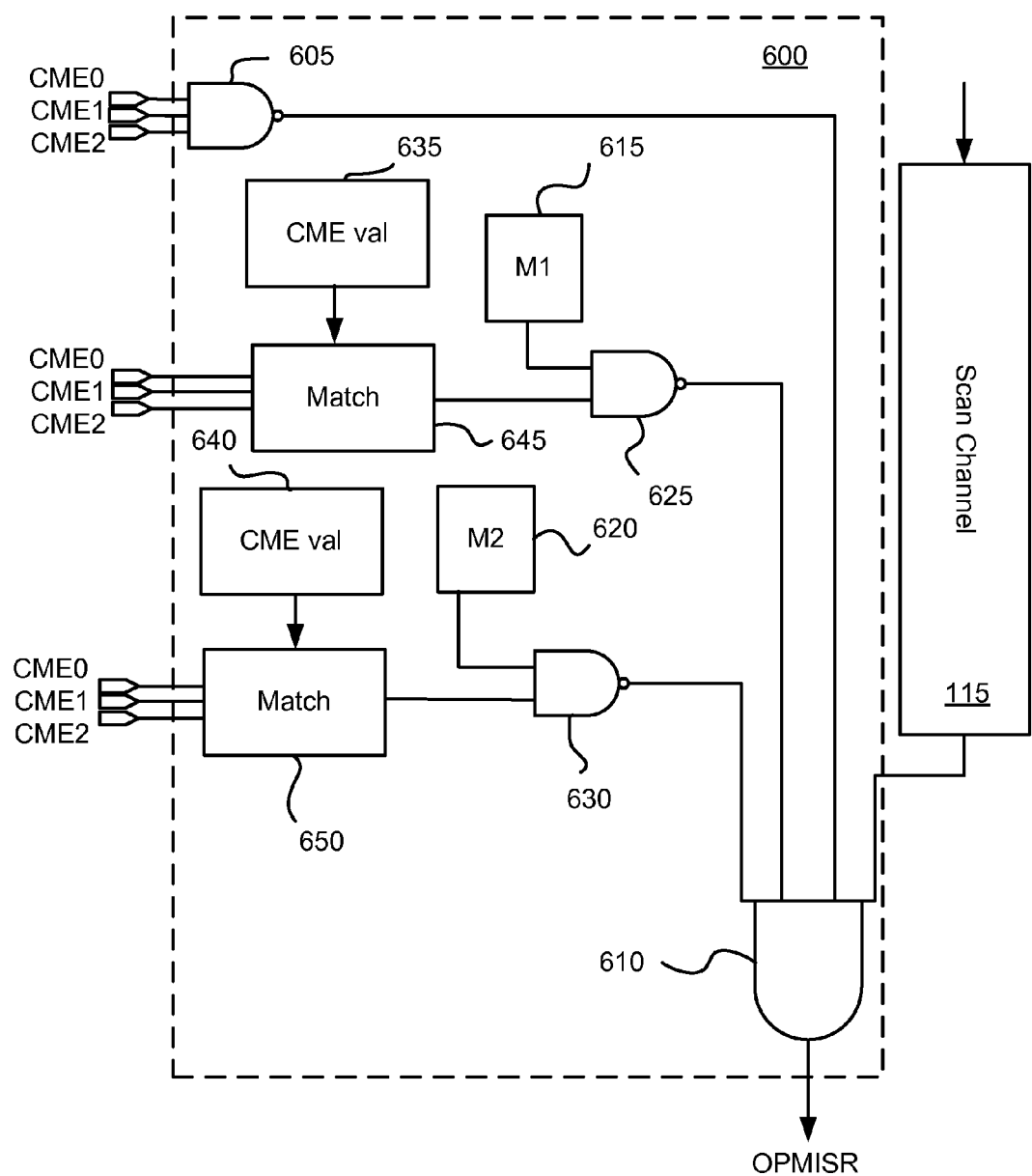
FIG. 6 illustrates circuit diagram of the mask logic of FIG. 1, according to various embodiments.

FIG. 6 depicts circuit diagram of mask logic 600, according to various embodiments. Mask logic 600 may be a representative embodiment of mask logic 120. The mask logic 600 may be used separate or in conjunction to the method 500 above to allow use of smaller individual HTB models for quicker processing, avoiding false masking, and creating few test patterns. The mask logic 600 essentially increases the number of masks and mask encodes without increasing the physical number of masks and without creating separate channel mask enables for each HTB.

The mask logic 600 may receive three CME inputs, a CME0, CME1, and CME2. The CME inputs may signal a respective first, second and third input of a NAND gate 605. The output of NAND gate 605 may couple to a second input of AND gate 610, which signals the output of a scan channel 115 to a MISR. The output of the scan channel 115 may be coupled to a first input of the AND gate 610. AND gate 610 may output a logical 0 when the scan channel outputs a logical 0. The AND gate 610 may output a logical 1 when the scan channel outputs a logical 1. The AND gate 610 may output whatever the scan channel 115 outputs unless a mask is enabled.

The three CME inputs: CME0, CME1, and CME2 may create eight encodes instead of the four created when there were two CME inputs, e.g., FIG. 2. When CME0, CME1, and CME2 are all logical ones, then the mask logic 600 masks all scan channels for the scan slice that all CME inputs are enabled. This may be represented by the NAND gate 605. When the CME inputs are all logical zeros, then no mask may be enabled. Six mask enable signals then remain, when taking into account the mask all encode and the no mask encode, compared to two when there are two CME inputs.

The mask logic 600 may also include a first mask 615 and a second mask 620. The output of the first mask may be coupled to a first input of a NAND gate 625. The output of the second mask may be coupled to a first input of a NAND gate 630. The outputs of NAND gate 625 and NAND gate 630 may be coupled to a third input and fourth input, respectively, of the AND gate 610.

The mask logic 600 may include two programmable decodes in a memory such as a register: a first memory 635 storing a first decode and a second memory 640 storing a second decode. The first decode may be compared in a first comparator 645 with the encode from the CME inputs. If the CME encode and first decode matches, then first comparator 645 may signal a second input of the NAND gate 625. This may enable the first mask 615. Likewise, a second decode in the second memory 640 may be compared with a second comparator 650 to the CME encode from the CME inputs. If the CME encode matches the second decode, then the second comparator 650 may signal a second input of the NAND gate 630. This may enable the second mask. In various embodiments, each scan channel 115 of a CUT 113 may be enabled with one of the six encodes, which may greatly reduce false masking without using a large amount of area on the chip with extra masks.

Figure 7:
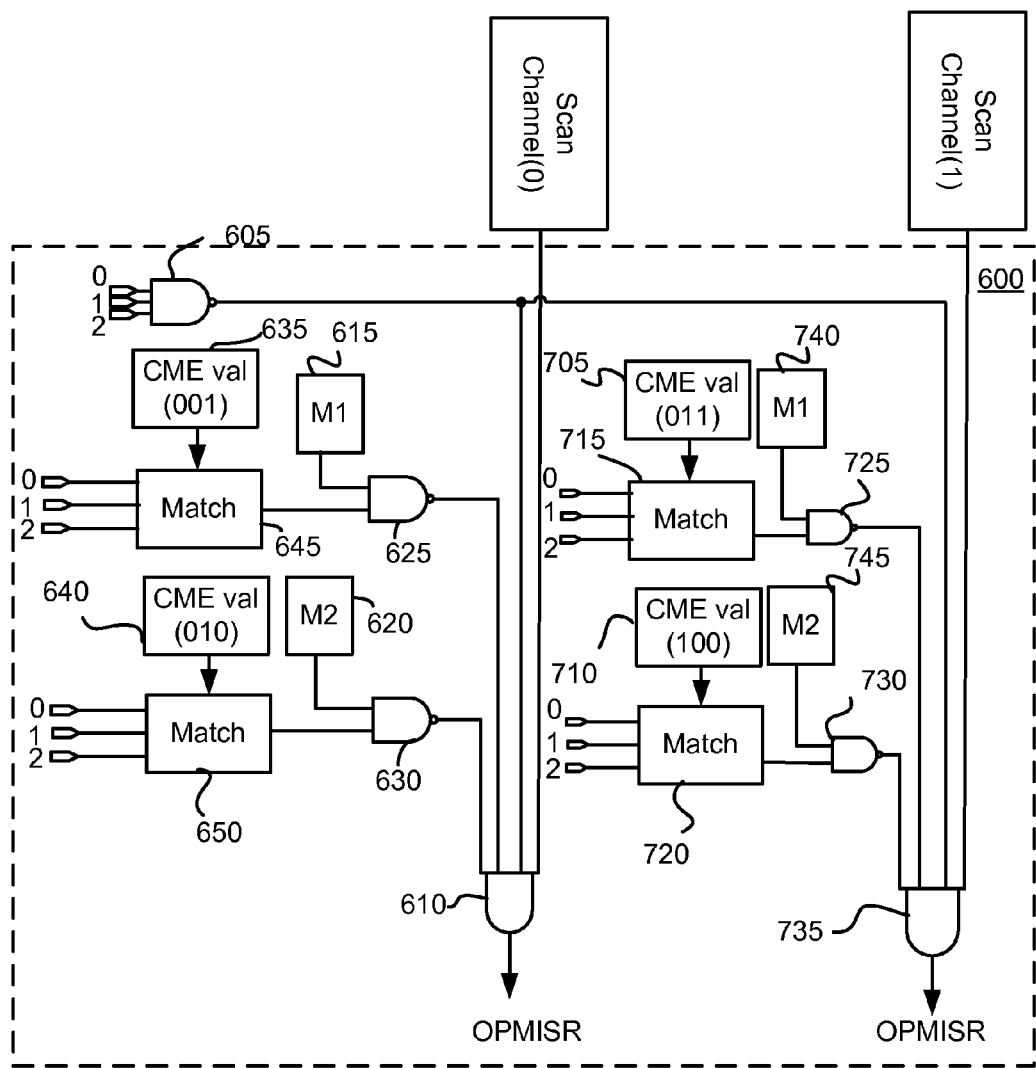
FIG. 7 illustrates the mask logic of FIG. 6 expanded to a plurality of scan channels, according to various embodiments.

FIG. 7 illustrates the mask logic 600 of FIG. 6 expanded to other scan channels 115, according to various embodiments. In this example each scan channel(0) and scan channel(1) may have two decodes. Scan channel(0) may have the first memory 635 having first decode and the second memory 640 having the second decode. The first decode may be for a CME encode of (001) where CME2 inputs a logical zero, CME1 inputs a logical zero, and CME0 inputs a logical one. The second decode may be for a CME encode of (010) where CME2 inputs a logical zero, CME1 inputs a logical one, and CME0 inputs a logical zero.

Likewise, scan channel(1) may have a third memory 705 and a fourth memory 710 with a respective third decode and fourth decode. The third decode may be for a CME encode of (011) where CME2 inputs a logical zero, CME1 inputs a logical one, and CME0 inputs a logical one. The fourth decode may be for a CME encode of (100) where CME2 inputs a logical one, CME1 inputs a logical zero, and CME0 inputs a logical zero.

In operation, the CME inputs may signal throughout pattern testing for each scan cycle, when a CME encode matches a decode of the various memories 635, 640, 705, and 710. For instance, when a CME encode of (100) is received by the mask logic 600, the second mask 745 may be enabled for the scan channel(1). When a CME encode (010) is received by the mask logic 600, the second mask 620 may be enabled for the scan channel(0). When a CME encode of (001) is received by the mask logic 600, the first mask 615 may be enabled for the scan channel(0). When a CME encode of (011) is received by the mask logic 600, the first mask 740 may be enabled for the scan channel(1). This may decrease over-masking since two x-states on scan channel(0) may be independently masked from two x-states on scan channel(1). One caveat is that scan channels having an x-state within the same scan slice may have to have their decodes match so that they may be masked at the same time.

In other various embodiments, each HTB may be assigned one or more unique encodes (perhaps zero encodes when no masking is needed in the HTB) to enable the first mask 625 and the second mask 630 of FIG. 6 for the scan channels 115 within the HTB. This may reduce the false masking across HTBs and also decrease test patterns when sorting and combining test patterns of multiple HTBs due to being able to combine more test patterns from individual HTBs to run together in a scan cycle.

Figure 8:
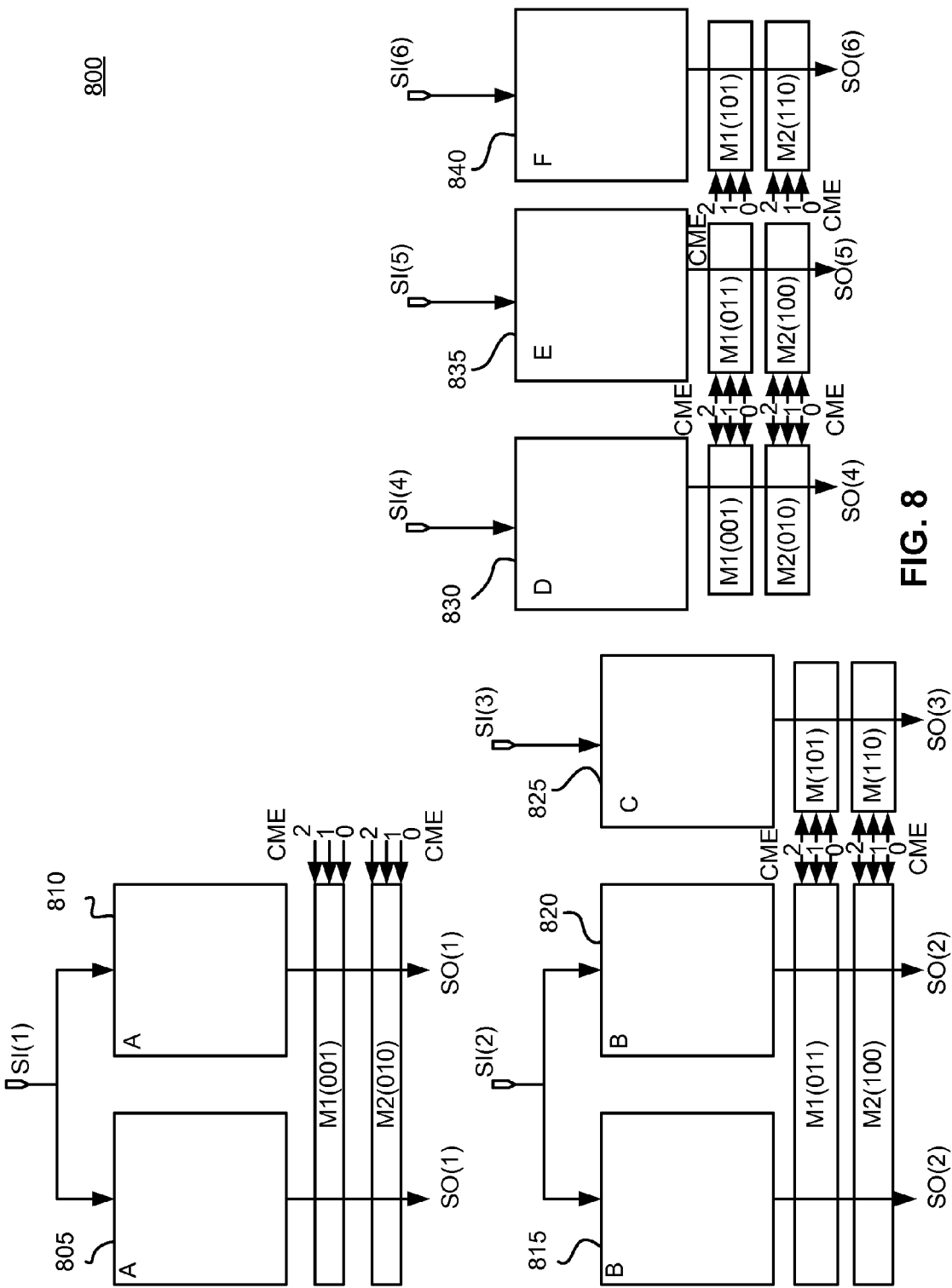
FIG. 8 illustrates a semiconductor chip with a plurality of HTBs using masking logic of FIG. 6, according to various embodiments.

FIG. 8 depicts a semiconductor chip 800 having a plurality of HTBs using masking logic 600, according to various embodiments. In the example shown in FIG. 8 the semiconductor chip 800 has eight HTBs, six of which are unique HTBs using the masking logic 600. The number of HTBs may be any number of HTBs, the number of HTBs in FIG. 8 represents an example, according to various embodiments. In the example shown in FIG. 8 there are eight HTBs: HTB A 805, HTB A 810, HTB B 815, HTB B 820, HTB C 825, HTB D 830, HTB E 835, and HTB F 840. Combining HTBs that are identical such as the HTB A 805 and HTB A 810 and HTB B 315 and HTB B 320 may be free in that they can share the same scan inputs and mask encodes. In FIG. 8 there are six unique HTBs, A, B, C, D, E, and F. A scan input signal SI(1) may input into the HTB A 805 and 810. Each HTB A 805 and 810 may output a scan output signal SO(1). HTB A 805 and 810 may be masked by a first mask M1 that may be assigned a CME encode of (001) from CME2, CME1 and CME0 respectively and by a second mask M2 that may be assigned a CME encode (010) from CME2, CME1 and CME0, respectively. In various embodiments, the assigned CME encode in the registers for each HTB may change from pattern to pattern, so while HTB A and HTB D match in this example, they may be assigned different encodes in another pattern.

A scan input signal SI(2) may signal the HTB B 815 and 820. HTB B 815 and 820 may output a scan output signal SO(2). HTB B 815 and 820 may be masked by the first mask M1 that may be assigned a CME encode of (011), which enables the mask, from CME2, CME1 and CME0, respectively and by the second mask M2 that may be assigned a CME encode (100) from CME2, CME1 and CME0, respectively.

A scan input signal SI(3) may input into the HTB C 825. HTB C 825 may output a scan output signal SO(3). HTB C 825 may be masked by the first mask M1 that may be assigned a CME encode of (101) from CME2, CME1, and CME0, respectively and by the second mask M2 that may be assigned a CME encode (110) from CME2, CME1 and CME0, respectively.

A scan input signal SI(4) may input into the HTB D 830. HTB D 830 may output a scan output signal SO(4). HTB D 830 may be masked by the first mask M1 that may be assigned a CME encode of (001) from CME2, CME1, and CME0, respectively and by the second mask M2 that may be assigned a CME encode (010) from CME2, CME1 and CME0, respectively. HTB D may share the same two mask encodes as HTB A. In various embodiments, HTB D may share the first mask encode of HTB A and share a second mask encode of a different HTB such as HTB B(100) or HTB C (110).

A scan input signal SI(5) may input into the HTB E 835. HTB E 835 may output a scan output signal SO(5). HTB E 835 may be masked by the first mask M1 that may be assigned a CME encode of (011) from CME2, CME1, and CME0, respectively and by the second mask M2 that may be assigned a CME encode (100) from CME2, CME1 and CME0, respectively. HTB E may share the same two mask encodes as HTB B in this example.

A scan input signal SI(6) may input into the HTB F 840. HTB F 840 may output a scan output signal SO(6). HTB F 840 may be masked by the first mask M1 that may be assigned a CME encode of (101) from CME2, CME1, and CME0, respectively and by the second mask M2 that may be assigned a CME encode (110) from CME2, CME1 and CME0, respectively. HTB F may share the same two mask encodes as HTB C in this example.

Each of the unique HTBs may require 1000 patterns for their own independent test. As stated before, each HTB may be tested serially, which means that if HTB A, HTB B, HTB C, HTB D, HTB E, and HTB F have 1000 patterns each for their test, the total number of patterns tested would be 6000. Running the patterns concurrently may present over masking issues as stated before. Furthermore, mask loading for every pattern can take a large part of the test time and data volume. Addressing the HTBs with different CME encodes, may reduce over-masking of scan slices over HTBs.

While having separate scan inputs for each HTB helps with independent test pattern generation, sharing test patterns by sharing the same scan input may allow for more patterns to be applied in less time. For instance, the test patterns created for HTB A may be applied to HTB B when tested for HTB A and test patterns created for HTB B may be applied to HTB A when tested for HTB B. Although the test patterns may not be generated for the specific HTB they may still provide test coverage. When using the two mask encode system, a scan slice of HTB B which may not have a scan latch with an unknown state may get masked when a scan latch of HTB A is masked for the HTB A test patterns. Having the different CME encodes for each HTB may prevent over-masking of HTB B when masking HTB A and vice versa. Additional masking may be created for HTB B when running the HTB A encodes, so the different CME encodes for each HTB may allow for independent masking of the HTBs.

Figure 9:
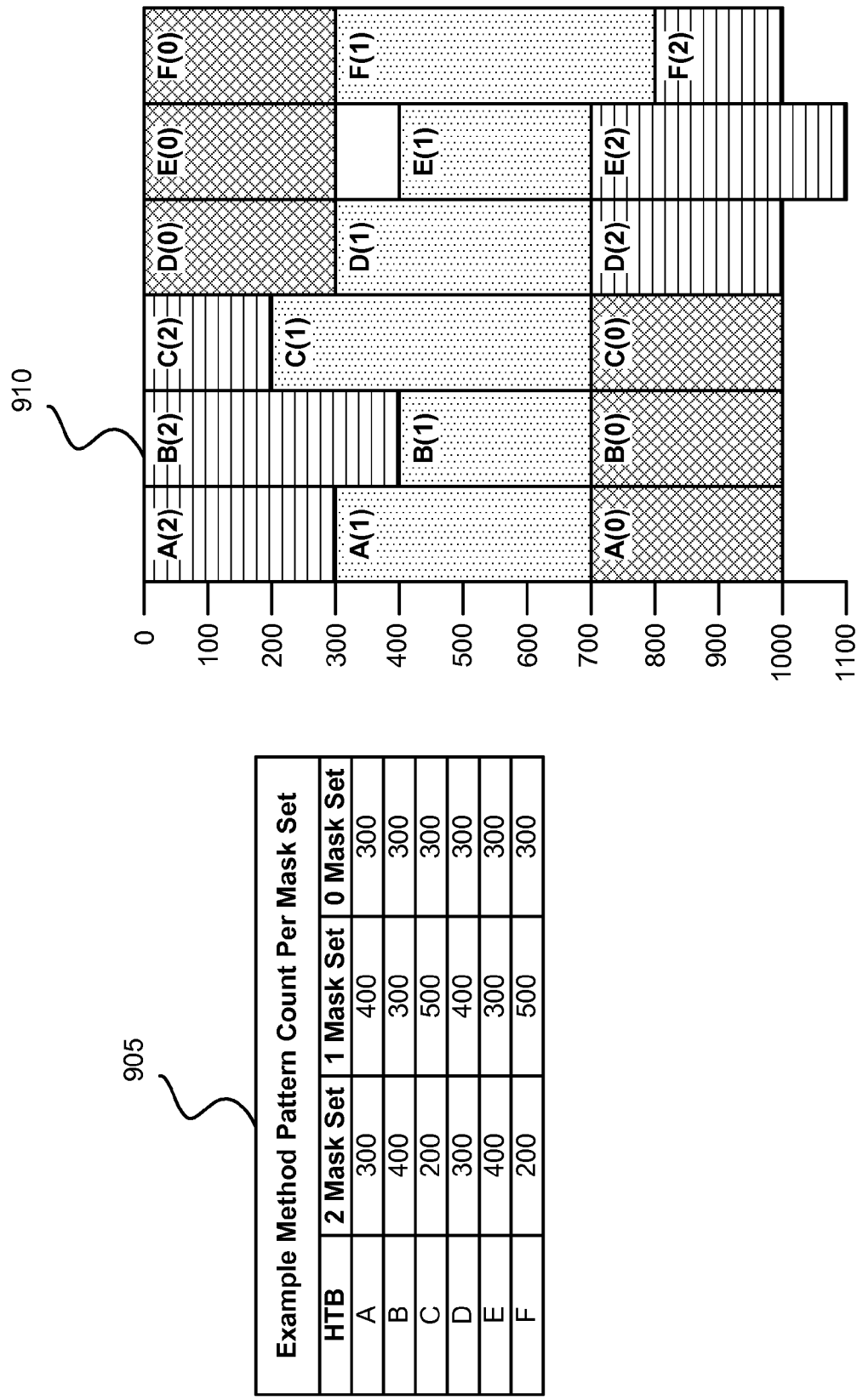
FIG. 9 illustrates a graphical representation of a method of sorting and combining test patterns of various HTBs, according to various embodiments.

FIG. 9 illustrates a graphical representation of a method of sorting and combining test patterns of various HTBs, according to various embodiments. All of the patterns for an HTB may be sorted out into groups of two, one, or zero mask sets. For example, patterns of two mask sets need both masks M1 and M2 for the pattern. Patterns of one mask sets need one of the masks. Patterns of zero mask sets may need no masks. Table 905 illustrates the HTBs of FIG. 8 and the pattern count per mask set for an illustrative example. HTB A has 300 patterns that need two mask sets, 400 patterns that require one mask set, and 300 patterns that require zero mask sets. HTB B may have 400 patterns that require the two mask set, 300 patterns that require one mask set, and 300 patterns that require zero mask sets. The HTB C may have 200 patterns that require two mask sets, 500 patterns that require one mask set, and 300 patterns that require zero mask sets. The HTB D may have 300 patterns that require two mask sets, 400 patterns that require one mask set, and 300 patterns that require zero mask sets. The HTB E may have 400 patterns that require two mask sets, 300 patterns that require one mask set, and 300 patterns that require zero mask sets. The HTB F may have 200 patterns that require two mask sets, 500 patterns that require one mask set, and 300 patterns that require zero mask sets. A mask pattern module sorting the patterns may know where the latches are within the scan channels that produce X-state results. The mask pattern module may know from the patterns it produces or from that a built in tester produces which patterns will need a certain number of masks. In this example, it is assumed that all latches across a scan slice for all HTBs are not going to be completely masked with a CME2, CME1, and CME0 encode of (111).

Once the patterns are sorted the mask pattern module may combine the groups of patterns from the various HTBs so that not more than the greatest number of mask encodes are used for a particular scan slice. In the chart 910, by using the information in table 905, the mask pattern module may align the test patterns of the HTBs requiring two mask sets together up to the maximum number of CME encodes. Because there are six different encodes, testing with patterns that require up to six "different masks" are allowed. Therefore, when each HTB has a maximum of two CME encodes, three HTBs having different CME encodes may be combined. In the given example HTB A(2), HTB B(2), and HTB C(2) patterns may be combined and begin at zero. These HTBs with the two mask set patterns may be padded with remaining zero mask set patterns of the remaining HTBs: HTB D(0), HTB E(0), and HTB F(0). In chart 910, HTB A(2) may be the first 300 patterns performed, HTB B(2) may perform concurrently 300 of its 400 patterns, and C(2) may perform concurrently its 200 patterns. While each of these are two mask pattern sets are performed, patterns requiring zero masks may pad the patterns that require two masks. Therefore, essentially 1800 patterns from the two mask sets and the zero mask sets of table 905 are reduced to 400 patterns which is the longest two mask set, HTB B(2).

After the patterns of the two mask sets have been combined with the patterns of the zero mask sets, then the one mask set patterns may be combined. The mask pattern module may pad the largest one mask set with the next largest mask set and so on up to the maximum number of encodes. Since there are six CME encodes, then there may be six HTB one mask sets running concurrently. The zero mask set of the remaining HTBs may be padded also with the one mask sets. For example, in chart 910 the largest one mask set C(1) may follow the C(2) patterns at pattern count 200. From pattern count 200 to 300 A(2), B(2), and C(1) may run together, which means there are only 5 CME encodes being used during that time. A(1), D(1), and F(1) may begin at pattern count 300. This increases the number of encodes used to six. Thus, E(1) is chosen not to run until more CME encodes are available after B(2) finishes. The gap between E(0) and E(1) may be filled with repeated E(0) patterns in various embodiments. Once the one mask sets finish the remaining two mask sets (D(2), E(2), and F(2)) may begin. The two mask sets D(2) and E(2) may begin at pattern 700 while F(2) may begin at pattern count 800. D(2) and F(2) may end at pattern count 1000 as well as the zero mask sets. The two mask set E(2) may be completed at pattern count 1100. Repeated zero mask sets or a combination of zero, one, and two mask sets may be used from pattern 1000-1100 while E(2) is finishing, according to various embodiments.

Figure 10:
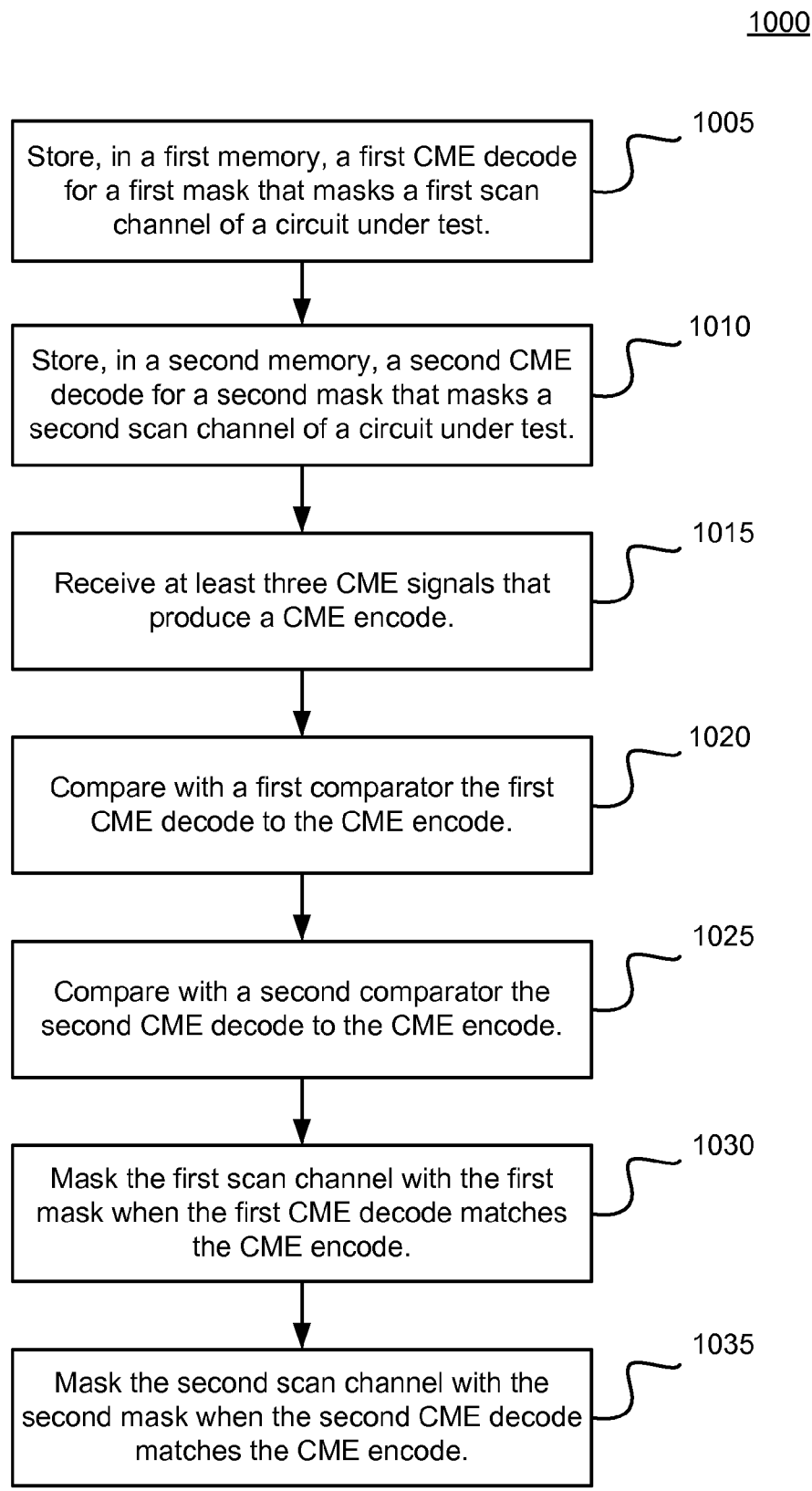
FIG. 10 depicts a flow diagram of a method of masking scan channels on a semiconductor chip, according to various embodiments.

FIG. 10 depicts a flow diagram of a method 1000 of masking scan channels on a semiconductor chip, according to various embodiments. In operation 1005, a first CME decode assigned to a first mask that masks a first scan channel may be stored in a first memory. In operation 1010, likewise, a second CME decode assigned to a second mask that masks a second scan channel may be stored in a second memory. In operation 1015, at least three CME signals may be received that produce a CME encode. A first CME signal may be received on a first CME pin. A second CME signal may be received on a second CME pin. A third CME signal may be received on a third CME pin. The three signals may make up the CME encode.

In operation 1020, the first CME decode may be compared to the CME encode with a first comparator. In operation 1025, the second CME decode may be compared to the CME encode with a second comparator. In operation 1030, the first scan channel may be masked with the first mask when the first CME decode matches the CME encode. In operation 1035, the second scan channel may be masked with the second mask when the second CME decode matches the CME encode.

While the Detailed Description may refer to specific types of transistors, logic gates, supply voltages, and the like it will be appreciated that one skilled in the art may implement same or similar functions using different transistors, logic gates, and supply voltages in alternative embodiments as described and still accomplish the same purpose of the invention. For example, transistors may be PFETs or NFETs. Logic gates may be AND, OR, XOR, NOR, NAND, XNOR or inverters. Therefore, the scope of the invention should not be limited.

Figure 11:
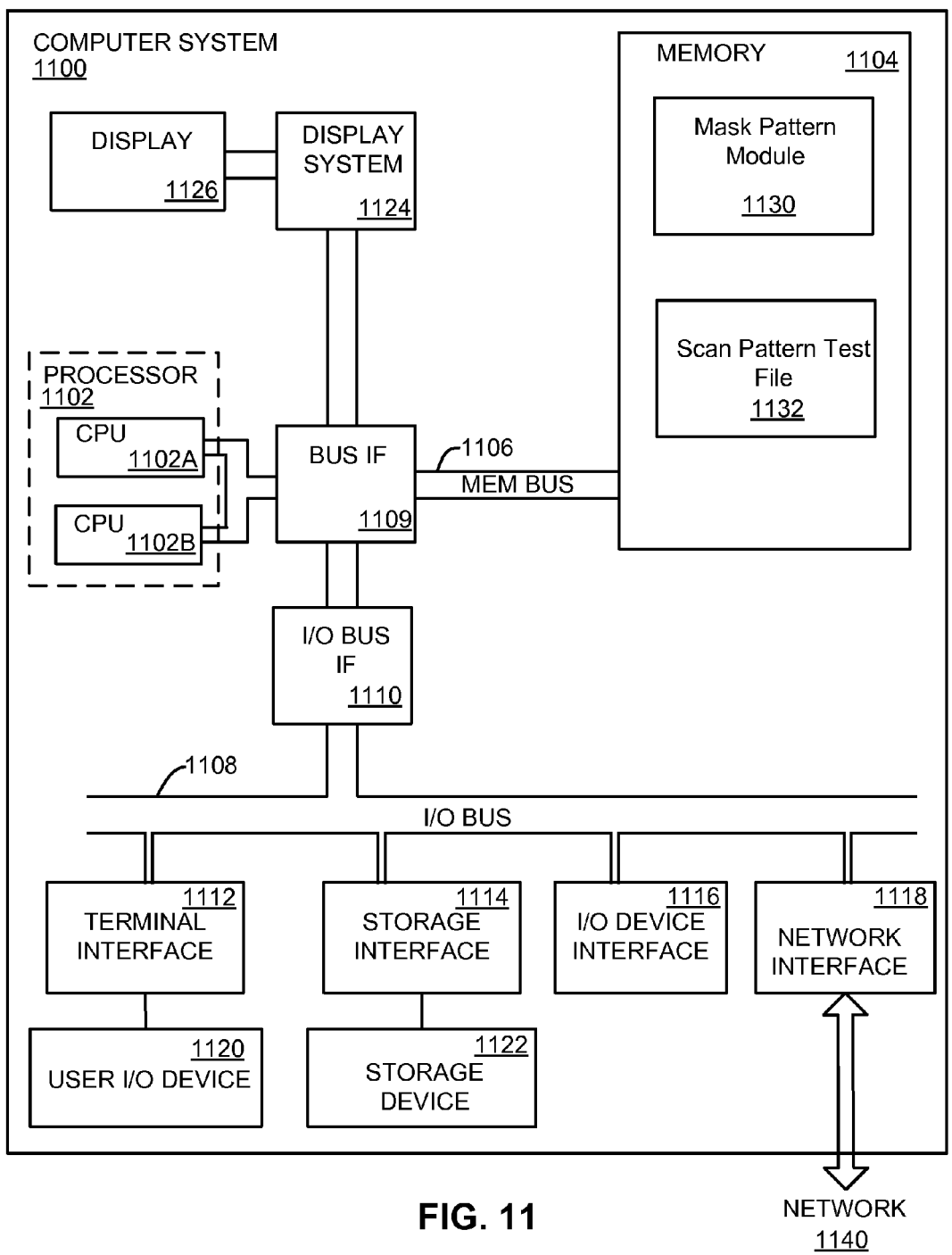
FIG. 11 is a schematic block diagram illustrating a computer system, according to various embodiments.

FIG. 11 is a schematic block diagram illustrating one embodiment of a computer system 1100. The computer system 1100 is one exemplary context in which embodiments may be implemented. The mechanisms and apparatus of the various embodiments disclosed herein apply equally to any appropriate computing system. The major components of the computer system 1100 include one or more processors 1102, a memory 1104, a terminal interface 1112, a storage interface 1114, an Input/Output ("I/O") device interface 1116, and a network interface 1118, all of which are communicatively coupled, directly or indirectly, for inter-component communication via a memory bus 1106, an I/O bus 1108, bus interface unit ("IF") 1109, and an I/O bus interface unit 1110.

The computer system 1100 may contain one or more general-purpose programmable central processing units (CPUs) 1102A and 1102B, herein generically referred to as the processor 1102. In an embodiment, the computer system 1100 may contain multiple processors; however, in another embodiment, the computer system 1100 may alternatively be a single CPU system. Each processor 1102 executes instructions stored in the memory 1104 and may include one or more levels of on-board cache.

In an embodiment, the memory 1104 may include a random-access semiconductor memory, storage device, or storage medium (either volatile or non-volatile) for storing or encoding data and programs. In another embodiment, the memory 1104 represents the entire virtual memory of the computer system 1100, and may also include the virtual memory of other computer systems coupled to the computer system 1100 or connected via a network 1140. The memory 1104 is conceptually a single monolithic entity, but in other embodiments the memory 1104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 1104 may store all or a portion of the following: mask pattern module 1130 and a scan pattern test file 1132. These programs and data structures are illustrated as being included within the memory 1104 in the computer system 1100, however, in other embodiments, some or all of them may be on different computer systems and may be accessed remotely, e.g., via a network 1130. The computer system 1100 may use virtual addressing mechanisms that allow the programs of the computer system 1100 to behave as if they only have access to a large, single storage entity instead of access to multiple, smaller storage entities. Thus, while the mask pattern module 1130 and a scan pattern test file 1132 are illustrated as being included within the memory 1104, these components are not necessarily all completely contained in the same storage device at the same time. Further, although mask pattern module 1130 and a scan pattern test file 1132 are illustrated as being separate entities, in other embodiments some of them, portions of some of them, or all of them may be packaged together.

In an embodiment, mask pattern module 1130 and a scan pattern test file 1132 may include instructions or statements that execute on the processor 1102 or instructions or statements that are interpreted by instructions or statements that execute on the processor 1102 to carry out the functions as further described below. In another embodiment, mask pattern module 1130 and a scan pattern test file 1132 may be implemented in hardware via semiconductor devices, chips, logical gates, circuits, circuit cards, and/or other physical hardware devices in lieu of, or in addition to, a processor-based system. In an embodiment, mask pattern module 1130 and a scan pattern test file 1132 may include data in addition to instructions or statements.

The computer system 1100 may include a bus interface unit 1109 to handle communications among the processor 1102, the memory 1104, a display system 1124, and the I/O bus interface unit 1110. The I/O bus interface unit 1110 may be coupled with the I/O bus 1108 for transferring data to and from the various I/O units. The I/O bus interface unit 1110 communicates with multiple I/O interface units 1112, 1114, 1116, and 1118, which are also known as I/O processors (IOPs) or I/O adapters (IOAs), through the I/O bus 1108. The display system 1124 may include a display controller, a display memory, or both. The display controller may provide video, audio, or both types of data to a display device 1126. The display memory may be a dedicated memory for buffering video data. The display system 1124 may be coupled with a display device 1126, such as a standalone display screen, computer monitor, television, or a tablet or handheld device display. In an embodiment, the display device 1126 may include one or more speakers for rendering audio. Alternatively, one or more speakers for rendering audio may be coupled with an I/O interface unit. In alternate embodiments, one or more of the functions provided by the display system 1124 may be on board an integrated circuit that also includes the processor 1102. In addition, one or more of the functions provided by the bus interface unit 1109 may be on board an integrated circuit that also includes the processor 1102.

The I/O interface units support communication with a variety of storage and I/O devices. For example, the terminal interface unit 1112 supports the attachment of one or more user I/O devices 1120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 1120 and the computer system 1100, and may receive output data via the user output devices. For example, a user interface may be presented via the user I/O device 1120, such as displayed on a display device, played via a speaker, or printed via a printer.

The storage interface 1114 supports the attachment of one or more disk drives or direct access storage devices 1122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 1122 may be implemented via any type of secondary storage device. The contents of the memory 1104, or any portion thereof, may be stored to and retrieved from the storage device 1122 as needed. The I/O device interface 1116 provides an interface to any of various other I/O devices or devices of other types, such as printers or fax machines. The network interface 1118 provides one or more communication paths from the computer system 1100 to other digital devices and computer systems; these communication paths may include, e.g., one or more networks 1140.

Although the computer system 1100 shown in FIG. 11 illustrates a particular bus structure providing a direct communication path among the processors 1102, the memory 1104, the bus interface 1109, the display system 1124, and the I/O bus interface unit 1110, in alternative embodiments the computer system 1100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 1110 and the I/O bus 1108 are shown as single respective units, the computer system 1100 may, in fact, contain multiple I/O bus interface units 1110 and/or multiple I/O buses 1108. While multiple I/O interface units are shown, which separate the I/O bus 1108 from various communications paths running to the various I/O devices, in other embodiments, some or all of the I/O devices are connected directly to one or more system I/O buses.

In various embodiments, the computer system 1100 is a multi-user mainframe computer system, a single-user system, or a server computer or similar device that has little or no direct user interface, but receives requests from other computer systems (clients). In other embodiments, the computer system 1100 may be implemented as a desktop computer, portable computer, laptop or notebook computer, tablet computer, pocket computer, telephone, smart phone, or any other suitable type of electronic device.

FIG. 11 is intended to depict the representative major components of the computer system 1100, according to various embodiments. Individual components, however, may have greater complexity than represented in FIG. 11, components other than or in addition to those shown in FIG. 11 may be present, and the number, type, and configuration of such components may vary. Several particular examples of additional complexity or additional variations are disclosed herein; these are by way of example only and are not necessarily the only such variations. The various program components illustrated in FIG. 11 may be implemented, in various embodiments, in a number of different manners, including using various computer applications, routines, components, programs, objects, modules, data structures, etc., which may be referred to herein as "software," "computer programs," or simply "programs."

Referring back to FIG. 11, embodiments may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
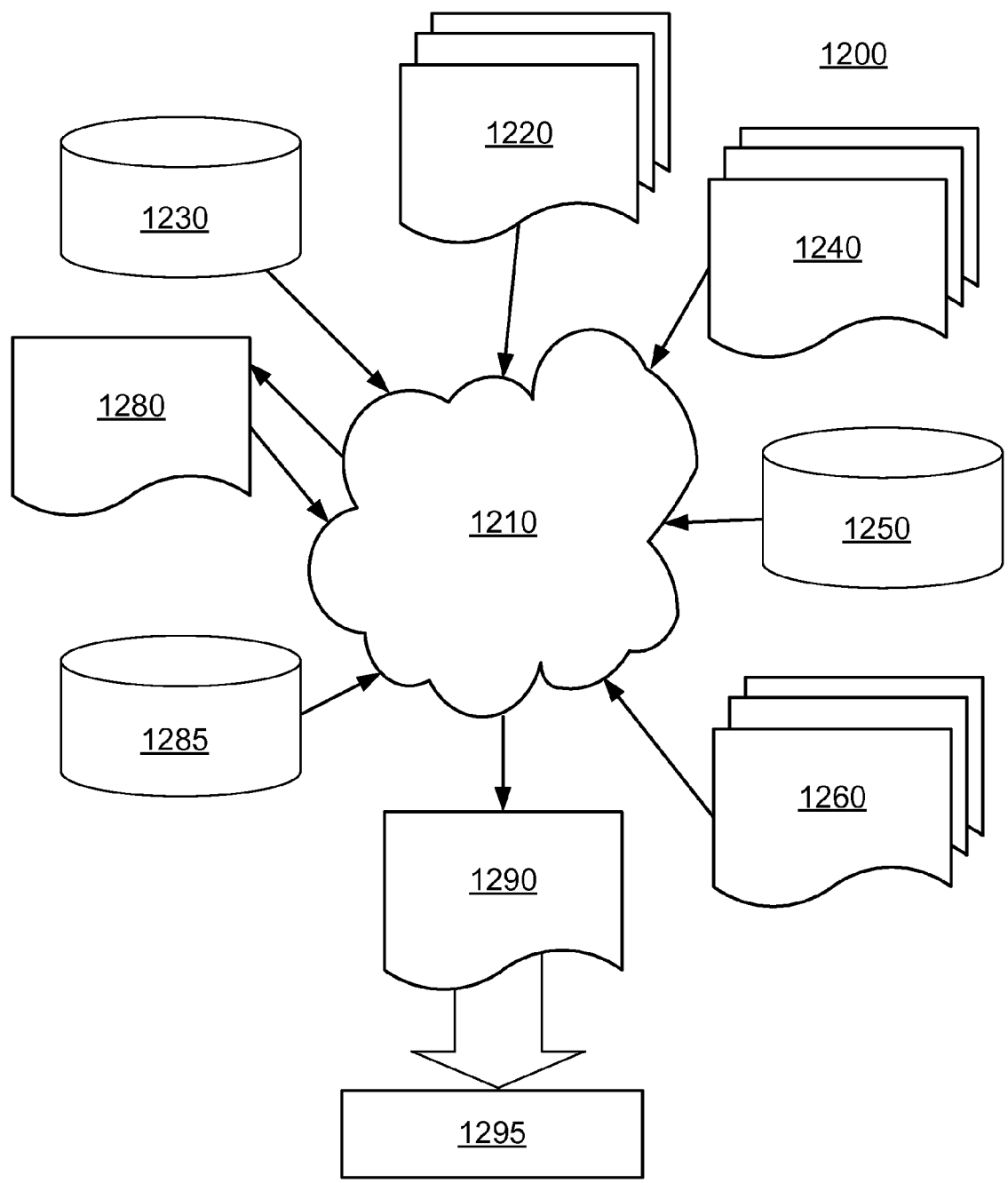
FIG. 12 shows a block diagram of an exemplary design flow used for example, in semiconductor IC logic design, simulation, test, layout, and manufacture.

FIG. 12 shows a block diagram of an exemplary design flow 1200 used for example, in semiconductor IC logic design, simulation, test, layout, and manufacture. Design flow 1200 includes processes, machines and/or mechanisms for processing design structures or devices to generate logically or otherwise functionally equivalent representations of the design structures and/or devices described above and shown in FIG. 1-11. The design structures processed and/or generated by design flow 1200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1200 may vary depending on the type of representation being designed. For example, a design flow 1200 for building an application specific IC (ASIC) may differ from a design flow 1200 for designing a standard component or from a design flow 1200 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1220 that is preferably processed by a design process 1210. Design structure 1220 may be a logical simulation design structure generated and processed by design process 1210 to produce a logically equivalent functional representation of a hardware device. Design structure 1220 may also or alternatively comprise data and/or program instructions that when processed by design process 1210, generate a functional representation of the physical structure of a hardware device. Whether representing functional and/or structural design features, design structure 1220 may be generated using electronic computer-aided design (ECAD) such as implemented by a core developer/designer. When encoded on a machine-readable data transmission, gate array, or storage medium, design structure 1220 may be accessed and processed by one or more hardware and/or software modules within design process 1210 to simulate or otherwise functionally represent an electronic component, circuit, electronic or logic module, apparatus, device, or system such as those shown in FIG. 1-11. As such, design structure 1220 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1210 preferably employs and incorporates hardware and/or software modules for synthesizing, translating, or otherwise processing a design/simulation functional equivalent of the components, circuits, devices, or logic structures shown in FIG. 1-FIG. 11 to generate a Netlist 1280 which may contain design structures such as design structure 1220. Netlist 1280 may comprise, for example, compiled or otherwise processed data structures representing a list of wires, discrete components, logic gates, control circuits, I/O devices, models, etc. that describes the connections to other elements and circuits in an integrated circuit design. Netlist 1280 may be synthesized using an iterative process in which netlist 1280 is resynthesized one or more times depending on design specifications and parameters for the device. As with other design structure types described herein, netlist 1280 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 1210 may include hardware and software modules for processing a variety of input data structure types including Netlist 1280. Such data structure types may reside, for example, within library elements 1230 and include a set of commonly used elements, circuits, and devices, including models, layouts, and symbolic representations, for a given manufacturing technology (e.g., different technology nodes, 22 nm, 32 nm, 45 nm, 120 nm, etc.). The data structure types may further include design specifications 1240, characterization data 1250, verification data 1260, design rules 1270, and test data files 1285 which may include input test patterns, output test results, and other testing information. Design process 1210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1210 without deviating from the scope and spirit of the invention. Design process 1210 may also include modules for performing standard circuit design processes such as timing analysis, verification, design rule checking, place and route operations, etc.

Design process 1210 employs and incorporates logic and physical design tools such as HDL compilers and simulation model build tools to process design structure 1220 together with some or all of the depicted supporting data structures along with any additional mechanical design or data (if applicable), to generate a second design structure 1290. Design structure 1290 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 1220, design structure 1290 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 1-11. In one embodiment, design structure 1290 may comprise a compiled, executable HDL simulation model that functionally simulates the devices shown in FIG. 1-11.

Design structure 1290 may also employ a data format used for the exchange of layout data of integrated circuits and/or symbolic data format (e.g. information stored in a GDSII (GDS2), GL1, OASIS, map files, or any other suitable format for storing such design data structures). Design structure 1290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 1-11. Design structure 1290 may then proceed to a stage 1295 where, for example, design structure 1290: proceeds to tape-out, is released to manufacturing, is released to a mask house, is sent to another design house, is sent back to the customer, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of creating a scan pattern test file for testing hierarchal test blocks (HTBs) of scan channels on a semiconductor chip comprising:
   determining a maximum number of channel mask enable encodes on the semiconductor chip;
   determining a maximum number of channel mask enable encodes used for a first HTB and a second HTB;
   sorting a plurality of test patterns used to test the first HTB and the second HTB into one or more mask sets, the sorting dependent on the number of masks each test pattern needs, the mask sets increase in mask number from a zero mask set having zero channel mask enable encodes to a mask set having the maximum number of channel mask enable encodes used for the respective HTBs; and
   combining test patterns of the mask sets of the first HTB and the second HTB to be performed simultaneously, wherein the number of masks per scan cycle of the combined mask sets is no more than the maximum number of channel mask enable encodes on the semiconductor chip and there is no scan slice overlap.

2. The method of claim 1, further comprising:
   combining zero mask sets of unrepresented HTBs in a scan cycle to mask sets of HTBs that require masking.

3. The method of claim 2, further comprising:
   retesting zero mask sets of an HTB when all zero mask sets of the retested HTB have been tested and mask sets of other HTBs remain to be tested.

4. The method of claim 1, further comprising:
   reusing channel mask enable encodes for HTBs that do not have any channel mask enable encodes assigned when all channel mask enable encodes have been assigned to one or more other HTBs.

5. The method of claim 4, further comprising:
   sorting the test patterns of the HTBs that have the same channel mask enable encodes so they are not performed at the same time.

6. The method of claim 1, further comprising:
   determining when test patterns of combined mask sets need different channel mask enable encodes at the same time; and
   rearranging the test patterns of combined mask sets that need different channel mask enable encodes at the same time so the test patterns do not occur in the same scan cycle.

7. The method of claim 1, further comprising:
   masking all test patterns of all test blocks with a mask all channel mask enable encode; and
   masking no test patterns of all the test blocks with a no mask channel mask enable encode.

8. A method of creating a scan pattern test file for testing hierarchal test blocks (HTBs) of scan channels on a semiconductor chip comprising:
   determining a maximum number of channel mask enable encodes on the semiconductor chip;
   determining a first maximum number of channel mask enable encodes of a first HTB;
   sorting a first plurality of test patterns used to test the first HTB into one or more first mask sets, the sorting into first mask sets based on the number of masks utilized by a given test pattern of the first HTB, the first mask sets increase in mask number from a zero mask set having zero channel mask enable encodes used for the first HTB to a mask set having the first maximum number of channel mask enable encodes used for the first HTB;
   determining a second maximum number of channel mask enable encodes of a second HTB;
   sorting a second plurality of test patterns used to test the second HTB into one or more second mask sets, the sorting into second mask sets based on the number of masks utilized by a given test pattern of the second HTB, the second mask sets increase in mask number from a zero mask set having zero channel mask enable encodes used for the second HTB to a mask set having the second maximum number of channel mask enable encodes used for the second HTB; and
   generating combined test patterns from test patterns in the first mask sets and the second mask sets, the combined test patterns having a number of masks per scan cycle that is equal to or less than the maximum number of channel mask enable encodes on the semiconductor chip and there is no scan slice overlap.

9. The method of claim 8, further comprising:
   combining zero mask sets of unrepresented HTBs in a scan cycle to mask sets of HTBs that require masking.

10. The method of claim 9, further comprising:
    retesting zero mask sets of an HTB when all zero mask sets of the retested HTB have been tested and mask sets of other HTBs remain to be tested.

11. The method of claim 8, further comprising:
    reusing channel mask enable encodes for HTBs that do not have any channel mask enable encodes assigned when all channel mask enable encodes have been assigned to one or more other HTBs.

12. The method of claim 11, further comprising:
sorting the test patterns of the HTBs that have the same channel mask enable encodes so they are not performed at the same time.

13. The method of claim 8, further comprising:
determining when test patterns of combined mask sets need different channel mask enable encodes at the same time; and
rearranging the test patterns of combined mask sets that need different channel mask enable encodes at the same time so the test patterns do not occur in the same scan cycle.

14. The method of claim 8, further comprising:
masking all test patterns of all test blocks with a mask all channel mask enable encode; and
masking no test patterns of all the test blocks with a no mask channel mask enable encode.

* * * * *